United States Patent
Raj

(10) Patent No.: US 9,652,747 B2
(45) Date of Patent: May 16, 2017

(54) CONTEXT BASED ALERT SYSTEM

(71) Applicant: Intel Corporation, Santa Clara, CA (US)

(72) Inventor: Ashok Raj, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 41 days.

(21) Appl. No.: 14/266,386

(22) Filed: Apr. 30, 2014

(65) Prior Publication Data

US 2015/0317892 A1 Nov. 5, 2015

(51) Int. Cl.
  *G06Q 10/10* (2012.01)
  *G08B 21/18* (2006.01)
  *H04M 3/436* (2006.01)

(52) U.S. Cl.
  CPC ....... *G06Q 10/1093* (2013.01); *G06Q 10/103* (2013.01); *G08B 21/18* (2013.01); *H04M 3/436* (2013.01); *H04M 2203/2072* (2013.01)

(58) Field of Classification Search
  CPC ..... H04M 2203/2072; H04M 3/42059; H04M 3/436; H04M 3/42068; H04M 3/42229; H04L 12/66; G01C 21/00; G01C 21/3617; G06Q 10/107
  USPC ............. 340/6.1, 309.16; 379/93.01, 201.02, 379/142.04, 210.01; 709/206
  See application file for complete search history.

(56) References Cited

U.S. PATENT DOCUMENTS

| | | | | |
|---|---|---|---|---|
| 2004/0225718 A1* | 11/2004 | Heinzel | ................ | G06Q 10/107 709/206 |
| 2009/0022297 A1* | 1/2009 | Jackson | ............... | G06Q 10/109 379/210.01 |
| 2009/0319320 A1* | 12/2009 | Daughtrey | ....... | G06Q 10/06393 705/7.18 |
| 2011/0212711 A1* | 9/2011 | Scott | .................... | G06Q 10/109 455/414.2 |
| 2011/0222675 A1* | 9/2011 | Chua | ...................... | H04L 12/66 379/93.01 |

(Continued)

OTHER PUBLICATIONS

Microsoft, Office Web Apps, "Calendar overview," http://office.microsoft.com/en-us/office365-suite-help/calendar-overview-HA102824447.aspx?CTT=5&origin=HA103267190; Sep. 18, 2014; pp. 1-5.

(Continued)

*Primary Examiner* — Mirza Alam
(74) *Attorney, Agent, or Firm* — Trop, Pruner & Hu, P.C.

(57) ABSTRACT

An embodiment allows for context based alerts/alarms. For example, an embodiment may automatically determine that a user is in a meeting with another person based on a meeting entry in the user's calendar. In such a situation the embodiment may divert an incoming phone call, which would ordinarily result in a ring tone, to go directly to voice mail based on the calendar entry. In an embodiment the alert may be delayed until the meeting concludes. Unlike conventional systems, various embodiments do not require a user to change notification rules, manually flip a hardware switch, or create a "Do Not Disturb" setting that allows just a single "silent" time during the day. An embodiment allows data in a calendar to automatically drive the behavior of how a notification panel operates. Other embodiments are described herein.

22 Claims, 4 Drawing Sheets

(56) References Cited

U.S. PATENT DOCUMENTS

2013/0345953 A1* 12/2013 Udeshi .................. G01C 21/00
701/117
2014/0343992 A1* 11/2014 DeMerchant ...... G06Q 10/1095
705/7.19

OTHER PUBLICATIONS iPhone J.D., Lawyers using iPhones and iPads, "The iPhone's Do Not Disturb feature," http://www.iphonejd.com/iphone_jd/2013/07/the-iphones-do-not-disturb-feature.html; Feb. 14, 2014; pp. 1-8.

* cited by examiner

CONTEXT BASED ALERT SYSTEM

TECHNICAL FIELD

An Embodiment Addresses Context Based Alert Systems for Mobile Computing Nodes.

BACKGROUND

Mobile computing nodes come in varied forms including Smartphones, tablets, notebooks, laptops, Ultrabooks®, and combinations thereof (e.g., hybrids such as a hybrid tablet and Smartphone). Mobile computing nodes also include many wearable computing nodes such as spectacles and wristwatches that allow a user to perform various computing tasks using oral commands, ocular movement based commands, and the like. These computing nodes help users with many tasks including general communications and organization. For example, the nodes may be used to communicate email, instant messages, short message service (SMS) texts, Snapchat® messaging, and the like. Upon receiving a message an alert may be communicated to the node user. For example, the node may "beep" or display a graphic on a display coupled to the system (e.g., a screen included in the Smartphone or wristwatch or a lens of eyeglasses). An alert may also relate to an incoming phone call, voice message, or appointment. Such an appointment may be something as simple as an entry on a calendar application of the node. The appointment may relate to "basketball practice" or "exercise". The alert may similarly relate to a meeting between the user and another person. The alert system of a mobile computing node can be instrumental in keeping the user of the node organized and in contact with others, even while traveling, in a meeting room of a business organization, or in a moving vehicle (e.g., plane, train, automobile).

BRIEF DESCRIPTION OF THE DRAWINGS

Features and advantages of embodiments of the present invention will become apparent from the appended claims, the following detailed description of one or more example embodiments, and the corresponding figures, in which:

DETAILED DESCRIPTION

Figure 1:
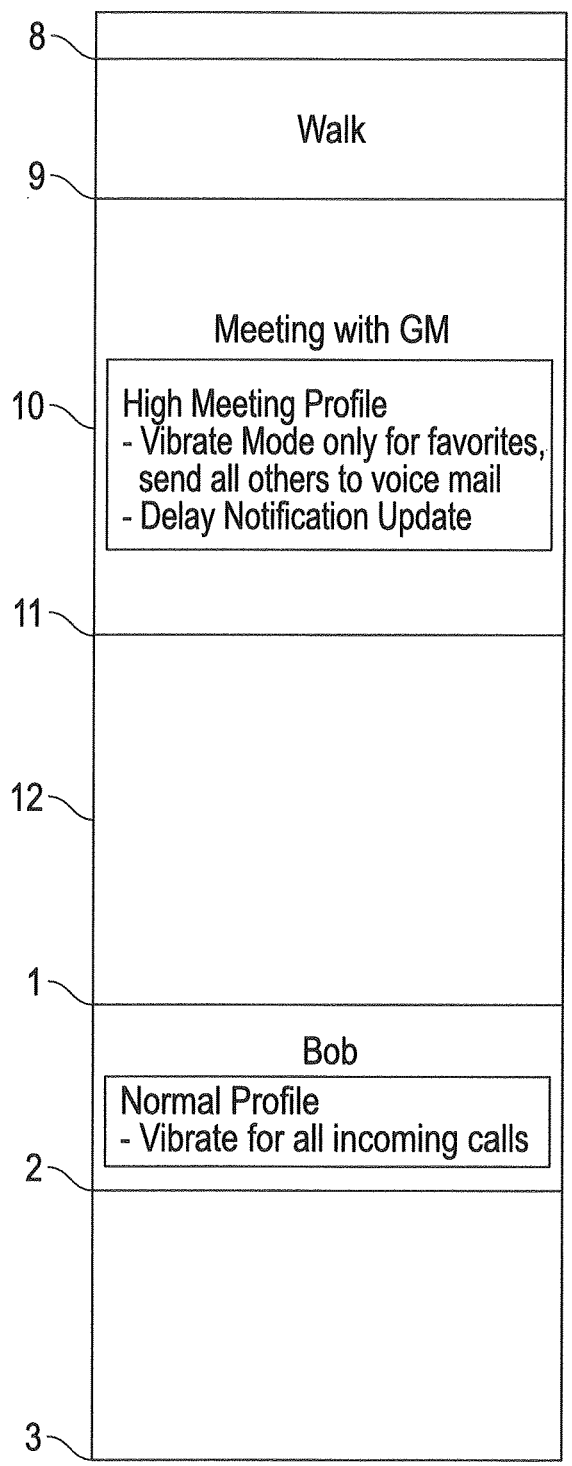
FIG. 1 includes calendar events and profiles in an embodiment of the invention.

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner.

As mentioned above, the alert system of a mobile computing node can be instrumental in keeping a user of the node organized and in contact with others. However, the alert system can also lead to unwanted distraction. For example, a user of the node may be attending an orchestral concert or may be asleep in the middle of the night. Receiving a loud ring tone from a relatively unimportant caller (e.g., a "wrong number" phone call) would be very unwelcome in such a situation. For such situations a user may manipulate a hardware based switch component of the node into "silent" mode so that such a phone call would go directly to voice mail. Further, the "silent" mode may mute any auditory signal (e.g., beep) related to an appointment. The user may also enter the silent mode by programming the node to be quiet from, for example, 10 p.m. to 6 a.m. (a typical sleeping period). No flipping of a hardware switch would be necessary in such a situation.

Such conventional systems partly address the "intrusion problem" but fall short in terms of truly protecting the user from unnecessary intrusion. In contrast, an embodiment of the invention allows for context based alerts/alarms. For example, an embodiment may automatically determine (with little to no user intervention) that the user is in a meeting with another person based on a meeting entry in the user's calendar. In such a situation the embodiment may divert an incoming phone call, which would ordinarily result in an audio ring tone and vibration of the computing node, to go directly to voice mail and provide no ring tone, vibration, or graphic alert (e.g., no notification of the phone call and/or voice mail) on the display of the node. In an embodiment the alert may be delayed until the meeting concludes according to the end time set for the meeting in the calendar. Unlike conventional systems, various embodiments do not require a user to change notification rules, manually flip a hardware switch to "silent mode", or create a "Do Not Disturb" setting that allows just a single time during the day for silence. An embodiment allows data in a calendar to automatically drive the behavior of how a notification panel (e.g., a graphic on a display of a node, such as a heads-up display in an automobile or a lens of wearable computing nodes such as spectacles) operates. For example, an embodiment allows data in a calendar to automatically drive how alert/event notifications (e.g., beeps, bells, whistles, vibrations, visual indicators or prompts) are controlled to automatically change behavior depending on the event type in the calendar. For example, a meeting with the user's boss may be handled differently than a meeting with the user's spouse (which my further still be handled differently than an appointment that does not involve another person, such as an appointment to run an errand). In other words, an embodiment allows the behavior of the mobile computing node to automatically adapt based on events in the calendar. Such an embodiment is scalable (i.e., is not restricted to just one single time slot for silence such as a night time sleeping period from 10 pm to 6 am) and may include many different meetings within a 24 hour period, and each of those meetings may be handled with a different "level of intrusion" (e.g., a beep, a vibration, a displayed graphic, a blinking light). Many such embodiments, more generally, provide a system and method for adaptive alert notifications (e.g., via visual, auditory, tactile, olfactory) based on user preferences such as calendar entries. A more detailed discussion of embodiments of the invention now follows.

An embodiment uses events in a user's calendar (that is coupled to the mobile computing node) to provide smart hints. These hints are used to control how notifications are controlled. For example, if the user has specified that an entry in the calendar is a meeting type event, the operating system (OS) for the node can use a meeting profile to choose how to handle phone rings and notification panel updates (e.g., from social media applications such as Facebook® or Twitter®) for the duration of the meeting. The profile may be defined by the user as "important" or "normal" using a graphical user interface (GUI) associated with the calendar event. The GUI may provide a checkbox the user selects to denote that a meeting is "important". However, the "important" status may be automatically attributed to the meeting based on a profile associated with other participants that, according to the calendar entry, are attending the meeting. For example, if a contact profile for a meeting attendee indicates the attendee is a "CEO" or corporate executive then the alert system may automatically categorize the meeting as "important" and mute all oral alerts and hide all visual alerts permanently or at least until the meeting is scheduled to be over.

An embodiment includes the following profile induced behavior. The embodiment allows only urgent calls from "favorite" or "important" people to vibrate during a calendar event. A person may be designated "important" by the user as indicated above (e.g., a user selection via a GUI or automatic solution). An "important" contact profile may be for the user's employer, spouse, parent, child, and the like. Any incoming call that is not from a "favorite" person will be sent directly to voice mail. As another example, a text message from an "important" designated person can cause an immediate notification via a notification panel update and/or a vibration of a portion of the node. Such a vibration may be the entire mobile computing node (e.g., vibrating an entire Smartphone) or a portion thereof (e.g., just the rear most portion of the earpiece of spectacles that function as a wearable computing node).

An embodiment may use context based clues to merely "shift" an alert, such as what would normally be an audio alert would be shifted to a vibratory alert, and what would normally be a vibratory alert would be shifted to a visual alert, and what would normally be a visual alert would be shifted to a delayed visual alert or delayed vibratory alert conveyed to the user after the calendar event has ended (e.g., after the meeting with the user's client is scheduled to be over). This shifting may occur even when a hardware switch coupled to the node is not muted (i.e., has not been manually flipped to a "silent" mode).

An embodiment includes a setting that is triggered automatically based on motion. An embodiment includes a setting that is triggered automatically based on a Bluetooth® connection event in an automobile to automatically switch to a mode whereby the system reads texts aloud, automatically responds to text with "I am driving, can't respond, will respond later", and similar type actions.

In an embodiment a user has multiple profiles and can choose a different profile for each event in the calendar, or have custom do-not-call/text/allow type settings that can be updated directly in the profile for extensibility.

FIG. 1 includes calendar events and profiles in an embodiment of the invention. More specifically, FIG. 1 represents a case with two profiles: "High Profile Meeting" and "Normal Profile Meeting". The "High Profile Meeting" or "High Meeting Profile" may be designated manually or automatically (e.g., based on attendee contact profile) and "Normal Profile Meeting" or "Normal Profile" may be a default designation. In other embodiments "High Profile Meeting" may be the default designation. As shown in FIG. 1, the user has an appointment from 8 a.m. to 9 a.m. to exercise. This may be classified as an "appointment" and not a "meeting" that actually involves another person. The appointment may default to a normal mode whereby alerts are handled in a normal fashion (e.g., phone calls have ring tones, texts cause the node to vibrate, and the like). The same may be true for the 1 p.m. to 2 p.m. meeting with Bob, who may be colleague. This meeting may be recurring and informal (e.g., a weekly status meeting) and would not be unduly hindered by the user being notified by a ring tone that a phone call is incoming. However, the meeting between 9 a.m. and 11 a.m. is with general manager "GM" and is critical. Thus, the high profile meeting with the GM has a default mode that sends all calls to voice mail except if the call is from a "favorite" contact (which then provides vibration of the node instead of a ring tone).

In an embodiment, with the "High Profile Meeting" all notifications go to a "delayed" notification panel update holding area except if the message is from a favorite contact. Once the calendar item is completed (e.g., the meeting is over based on satisfying the end time for the meeting), the notification hold list is released to the standard notification area for the user to process. In other words, an alert that a text has arrived may normally cause an auditory beep but in this case the beep would not occur until the meeting is over.

Figure 2:
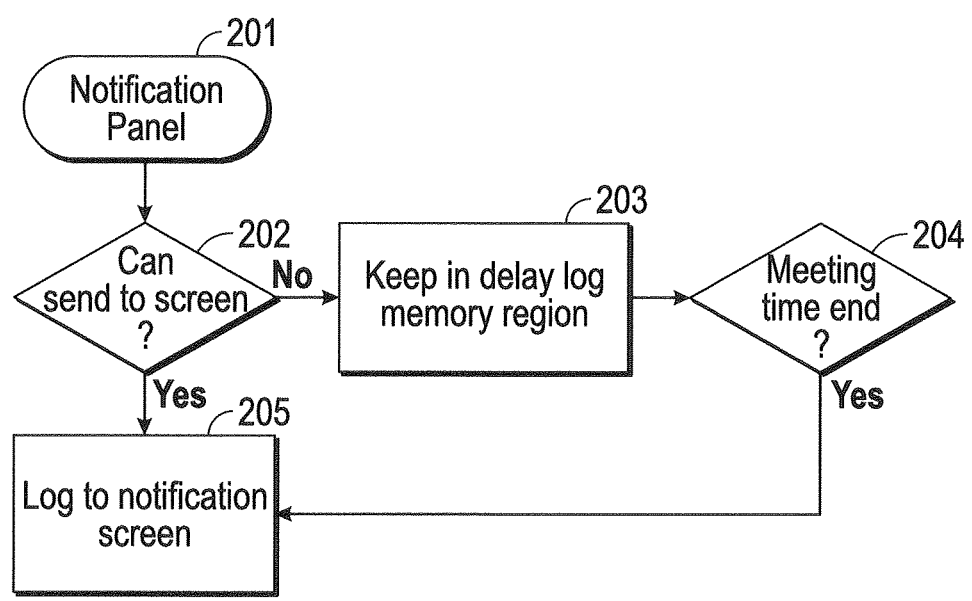
FIG. 2 includes a flow chart for executing computer instructions in an embodiment of the invention.

FIG. 2 includes a flow chart for executing computer instructions in an embodiment of the invention for this "delay" feature. In block 201 a notification (e.g., a text) that is typically destined for a notification panel (e.g., a display coupled to the system) is obtained. For example, the node pulls a notification from a cloud based resource or receives a notification that is pushed from the cloud based resource. In block 202 the instructions determine if the notification should be sent to the panel. This may be a decision based on profiles, such as the meeting profiles "High profile meeting" and "Normal profile meeting" of FIG. 1. With the "High profile meeting" of FIG. 1 the "no" branch of FIG. 2 is taken and with the "Normal profile meeting" of FIG. 1 the "yes" branch of FIG. 2 is taken (which leads to block 205 where the notification is displayed via the notification panel). With the "no" branch being taken block 203 keeps the notification in a delay log in a memory region (e.g., memory 1034 or 1028 of FIG. 4). This memory region may be one or more memories within the chassis that houses the system and/or in a cloud based repository. In block 204 a decision is made regarding whether the meeting is over (i.e., has the meeting with the GM, set to extend from 9 a.m. to 11 a.m., ended considering the time of day is now 11:01 a.m.). If "no", the delay continues but if "yes" the process continues to block 205.

In an embodiment, notification updates are enhanced with some special keywords or settings. For example, an embodiment utilizes special strings for the phone to do additional processing. If a message sender sends a text including or coupled to an "URG" string (indicating the message is urgent), the phone will then chime even though general profile rule says to vibrate. For example, during the "High profile meeting" of FIG. 1 the text would normally only vibrate but in this case, due to the string, the text would still chirp aloud. In other embodiments instead of a string the text may have a header including an urgent indicator, whereby the urgent indicator was selected from the sender via a GUI.

In an embodiment a "SET$_{13}$ TIMER" string (or setting included in the header or a message) may be included in or coupled to a text. The string sets an alarm or timer for a specified time to remind the user to perform an action. For example, a spouse may know a user is in an important meeting so the spouse may text a time based string that says "get milk on way home" with the time or alert set to activate during the user's normal commute home from work. This provides an embodiment with smart advanced handling of notification panel updates.

Such embodiments provide user centric designs and features that are designed with users in mind. Doing so provides organizations that provide these features a way to distinguish themselves from peer organizations. This may drive acceptance of this technology because it allows users more configurations and permits differentiation for service providers. For example, allowing a user a configuration to permit notification panel updates and control alerts using smart inputs from the consumer would provide a distinct advantage to organizations providing mobile computing nodes or providing services to such nodes.

Figure 3:
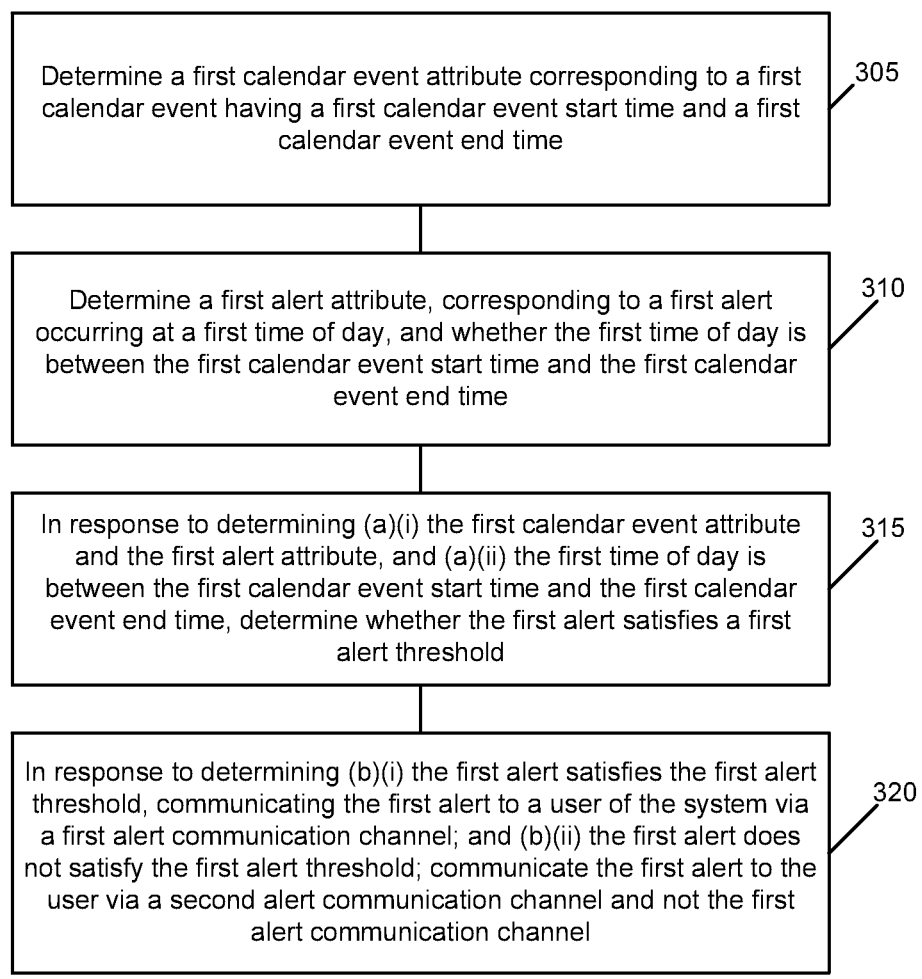
FIG. 3 includes a flow chart for executing computer instructions in an embodiment of the invention.

FIG. 3 includes a flow chart for executing computer instructions in an embodiment of the invention. A specific example is used to clarify one particular embodiment for the reader but other embodiments are not so limited.

Block 305 determines a first calendar event attribute corresponding to a first calendar event having a first calendar event start time and a first calendar event end time. For example, the first calendar event attribute may be that the event is an appointment to exercise or pick up dry-cleaned clothes or that the event is a meeting, such as meeting with a potential client, the user's boss, or a dinner "meeting" with the user's spouse. The event may have a start and stop times. This may occur in a logic module "calendar event attribute determination module" 1041 located in or coupled to chipset 1090.

Block 310 determines a first alert attribute, corresponding to a first alert occurring at a first time of day, and whether the first time of day is between the first calendar event start time and the first calendar event end time. For example, the first alert attribute may be that the alert is a phone call, the alert is a phone call from an "important" contact such as the user's boss, the alert is a text, or the alert is a text from an "important" contact such as the user's child. Further, the instructions may determine if the alert is occurring during the calendar event such as whether the incoming phone call is occurring during a meeting scheduled for the user. This may occur in a logic module "first alert attribute determination module" 1042 located in or coupled to chipset 1090.

Block 315, in response to determining (a)(i) the first calendar event attribute and the first alert attribute, and (a)(ii) the first time of day is between the first calendar event start time and the first calendar event end time, determines whether the first alert satisfies a first alert threshold. For example, based on determining the phone call (alert attribute) is from an unknown source (alert attribute) and is occurring during a meeting (calendar event attribute), the instructions may determine the first alert does not satisfy the threshold. For example, based on determining the phone call (alert attribute) is from the CEO of the user's employer (alert attribute) and is occurring during a meeting (calendar event attribute), the instructions may determine the first alert does satisfy the threshold. For example, based on determining the phone call (alert attribute) is from the CEO of the user's employer (alert attribute) and is occurring during a meeting (calendar event attribute) with the CEO of a client (calendar event attribute), the instructions may determine the first alert does not satisfy the threshold. This may occur in a logic module "alert threshold determination module" 1043 located in or coupled to chipset 1090.

Block 320, in response to determining (b)(i) the first alert satisfies the first alert threshold, communicating the first alert to a user of the system via a first alert communication channel; and (b)(ii) the first alert does not satisfy the first alert threshold, communicates the first alert to the user via a second alert communication channel and not the first alert communication channel. For example, communicating the first alert to a user of the system via a first alert communication channel may mean delivering a text to the user visually (via notification panel) and with vibration of the node. For example, communicating the first alert to the user via a second alert communication channel and not the first alert communication channel may mean delivering the text visually (via notification panel) and with no vibration of the node. For example, communicating the first alert to the user via a second alert communication channel and not the first alert communication channel may mean delivering the text to memory (e.g., memory 1034 of FIG. 4) and, after a delay, delivering the first alert to the user. For example, in an embodiment communicating the first alert via the first alert communication channel includes at least one of communicating audio via a speaker (e.g., element 1024 of FIG. 4) coupled to the system and vibrating at least a portion of the system; and communicating the first alert to the user via the second alert communication channel does not include audio delivered via the speaker. This may occur in a logic module "alert communication module" 1044 located in or coupled to chipset 1090.

In an embodiment the first calendar event attribute includes the meeting designated at a first priority level and not at a second priority level, the first priority level being higher than the second priority level in a hierarchy of levels. For example, FIG. 1 includes a "high profile meeting" priority level for the GM meeting and a "normal profile meeting" priority level for the meeting with Bob.

In an embodiment, wherein the first time of day is closer to the first calendar event start time than the first calendar event end time, the at least one medium comprises instructions to delay communicating the first alert to the user via at least one of the first and second alert communication channels until at least the first calendar event end time. Thus, in an embodiment involving a situation such as that of FIG. 1, an alert may be obtained at 9:15 a.m. during the meeting with the GM. The alert may be that a text has arrived. All or some of the alert notifications may be delayed until 11 a.m. or thereafter (e.g., 11:05 a.m.). The delayed alert notification(s) (e.g. a beep and or visual display), when eventually delivered, avoids interrupting the meeting but also serves as indicator to the user that the allotted time for the meeting has ended. This may occur in a logic module "delay module" 1045 located in or coupled to chipset 1090.

In an embodiment the first calendar event attribute indicates a meeting is an on-line meeting. In such an embodiment one of the attendees may have a contact profile that would normally push the meeting to a "high profile meeting" designation but such a designation may be overridden and the meeting may be designated a "normal profile meeting" because the sensitivity of an on-line meeting (versus in person meeting) is lessened.

In an embodiment communicating the first alert to the user via the second alert communication channel and not the first alert communication channel is not in response to the user manually selecting a physical button included in the system. In an embodiment communicating the first alert to the user via the second alert communication channel and not the first alert communication channel is not in response to the user selecting a generic sleep mode for the system that is not a function of the first calendar event attribute. Thus, regardless of whether the user flips a hardware switch to silent mode (or uses a generic sleep setting corresponding to quiet between 10 p.m. and 6 a.m.) a silent or reduced intrusion (e.g., downgrading an audio alert to vibratory alert and a vibratory alert to a visual alert and a visual alert to nothing) may still be employed. Thus, an embodiment comprises instructions to communicate the first alert to the user via the first alert communication channel when a setting for the system, which includes mute and non-mute settings, is set to non-mute.

An embodiment includes instructions to: determine a second calendar event attribute corresponding to a second calendar event having a second calendar event start time and a second calendar event end time; determine a second alert attribute, corresponding to a second alert occurring at a second time of day, and whether the second time of day is between the second calendar event start time and the second calendar event end time; in response to determining (a)(i) the second calendar event attribute and the second alert attribute, and (a)(ii) the second time of day is between the second calendar event start time and the second calendar event end time, the second time of day being within 4 hours of the first time of day, determining whether the second alert satisfies the first alert threshold; in response to determining (b)(i) the second alert satisfies the first alert threshold, communicating the second alert to the user via the first alert communication channel; and (b)(ii) the second alert does not satisfy the first alert threshold; communicating the second alert to the user via the second alert communication channel and not the first alert communication channel. Thus, this embodiment provides for, merely as an example, multiple meetings within a 24 hour period of time and the multiple meetings may be handled differently. For example, as shown with FIG. 1, one meeting may be treated as "high profile" while another meeting is treated as "low profile". Between the two meetings there may be a period with no meetings or appointments (i.e., "clear" or "white" space), such as the 11 a.m. to 1 p.m. slot in FIG. 1. The two meetings may each be fully included within a 12 hour shift, such as 12 a.m. to 12 p.m., as shown in FIG. 1.

An embodiment comprises instructions to: determine the first calendar event attribute includes a meeting including the user and another person other than the user and the second calendar event attribute does not include a meeting between the user and any other person; and in response to determining the first calendar event attribute includes the meeting and the second calendar event attribute does not include the meeting, determine the first alert satisfies the first alert threshold and the second alert does not satisfy the first alert threshold. For example, an embodiment may classify all meetings (defined as events involving two or more people) as "high profile" and require reduced intrusion for an alert. However, the embodiment may classify all appointments (defined as events not involving two or more people or at least not listing any attendees besides the user, such as the user exercise on his or her own) as "normal profile" and not require reduced intrusion for an alert.

An embodiment includes instructions to: determine a priority level for the another person; in response to determining the priority level for the another person, determine the first alert satisfies the first alert threshold. For example, the embodiment may include an assessment of invited persons or accepted invitations and classify the meeting accordingly. A meeting with a contact having a profile marked as "high profile" (or a contact profile even including terms like "manager" or "CFO") may lead to an automatic classification of a meeting as "high profile" with corresponding reduced intrusion for alerts.

In an embodiment the first alert includes a message and the first alert attribute couples to a string. The embodiment includes instructions to determine whether the first alert satisfies the first alert threshold in response to the string. For example, a text or instant message including the words "URG" may take a communication normally destined for a "normal profile" status to a "high profile" status.

An embodiment includes instructions to determine an additional first alert attribute; and in response to determining the first alert attribute and the additional first alert attribute, determining whether the first alert satisfies a first alert threshold. For example, the first alert attribute may include whether the alert corresponds to a phone call (which, in a hierarchy defined by a manufacturer or user is more high profile than a text) and whether that phone call comes from a person designated as "important." Thus, there may be various attributes to be considered before determining whether to reduce intrusion for an alert and by how much to reduce the intrusion level (e.g., moving a phone call that normally corresponds to an audio beep down to a vibratory message and/or a visual message or no feedback at all).

In an embodiment the first alert attribute corresponds to a light sensor (e.g., element 1014 of FIG. 4) for the system and the additional first alert attribute corresponds to a spatial orientation system (e.g., element 1014 of FIG. 4) of the system. Thus, the attributes collectively determine if a user has placed his Smartphone face down on a table, indicating his or her wish to not be bothered unless an urgent or high profile alert is at issue.

Embodiments discussed herein may utilize a system such as the system of FIG. 4, discussed below. In fact, embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as (a) a computer program product that may include one or more machine readable media having stored thereon instructions that may be used to program a processing system or other electronic device to perform the methods or (b) at least one storage medium having instructions stored thereon for causing a system to perform the methods. The term "machine readable medium" or "storage medium" used herein shall include any medium that is capable of storing or encoding a sequence of instructions (transitory media, including signals, or non-transitory media) for execution by the machine and that cause the machine to perform any one of the methods described herein. The term "machine readable medium" or "storage medium" shall accordingly include, but not be limited to, memories such as solid-state memories, optical and magnetic disks, read-only memory (ROM), programmable ROM (PROM), erasable PROM (EPROM), electrically EPROM (EEPROM), a disk drive, a floppy disk, a compact disk ROM (CD-ROM), a digital versatile disk (DVD), flash memory, a magneto-optical disk, as well as more exotic mediums such as machine-accessible biological state preserving or signal preserving storage. A medium may include any mechanism for storing, transmitting, or receiving information in a form readable by a machine, and the medium may include a medium through which the program code may pass, such as antennas, optical fibers, communications interfaces, etc. Program code may be transmitted in the form of packets, serial data, parallel data, etc., and may be used in a compressed or encrypted format. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

Regarding "module" in particular, a module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or microcode.

Figure 4:
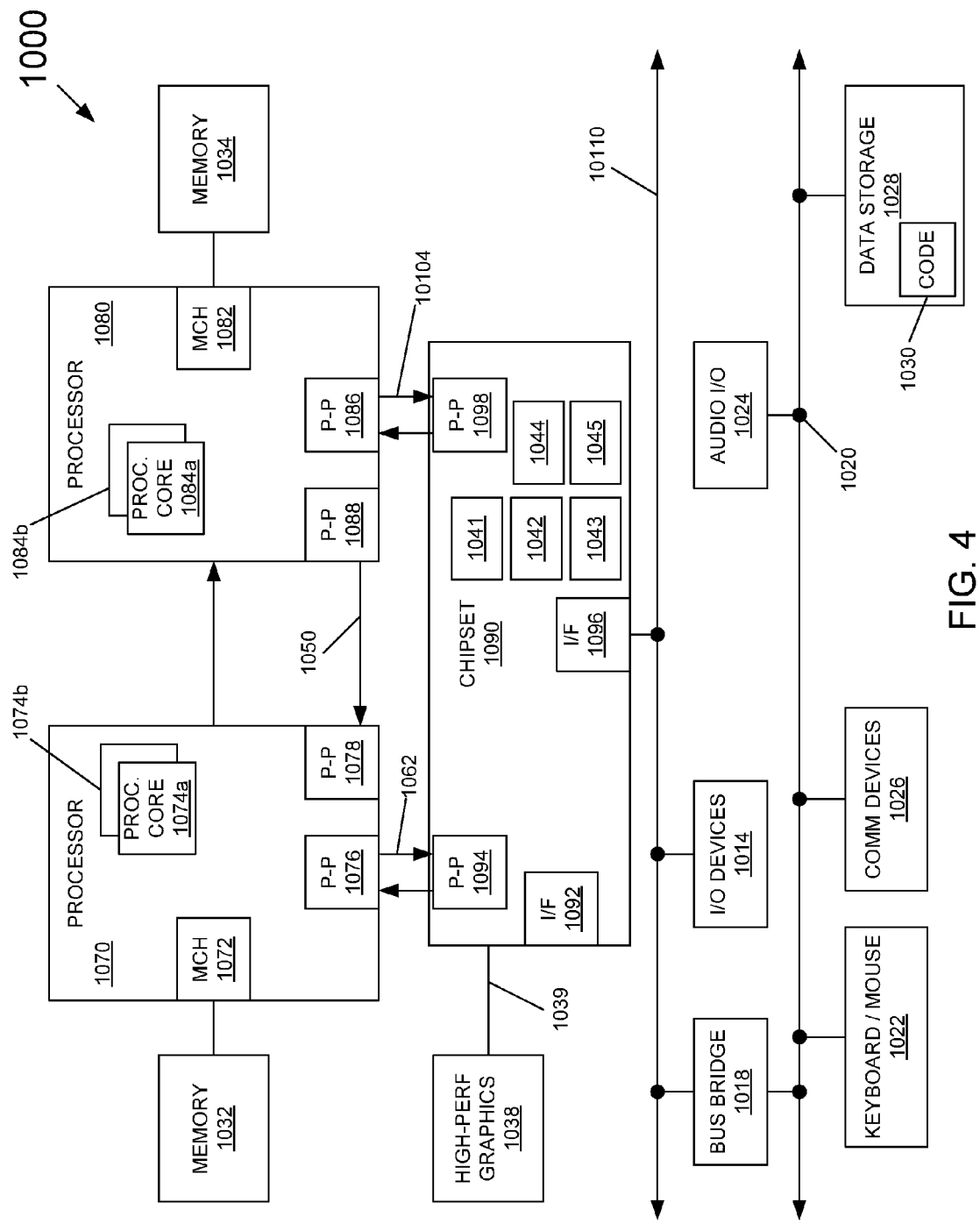
FIG. 4 includes a system for use with an embodiment of the invention.

Referring now to FIG. 4, shown is a block diagram of a system embodiment 1000 in accordance with an embodiment of the present invention. System 1000 may be included in, for example, a mobile computing node such as a cellular phone, Smartphone, tablet, Ultrabook®, notebook, laptop, personal digital assistant, and mobile processor based platform.

Shown is a multiprocessor system 1000 that includes a first processing element 1070 and a second processing element 1080. While two processing elements 1070 and 1080 are shown, it is to be understood that an embodiment of system 1000 may also include only one such processing element. System 1000 is illustrated as a point-to-point interconnect system, wherein the first processing element 1070 and second processing element 1080 are coupled via a point-to-point interconnect 1050. It should be understood that any or all of the interconnects illustrated may be implemented as a multi-drop bus rather than point-to-point interconnect. As shown, each of processing elements 1070 and 1080 may be multicore processors, including first and second processor cores (i.e., processor cores 1074*a* and 1074*b* and processor cores 1084*a* and 1084*b*. Such cores 1074, 1074*b*, 1084*a*, 1084*b* may be configured to execute instruction code in a manner similar to methods discussed herein.

Each processing element 1070, 1080 may include at least one shared cache. The shared cache may store data (e.g., instructions) that are utilized by one or more components of the processor, such as the cores 1074*a*, 1074*b* and 1084*a*, 1084*b*, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the present invention is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, microarchitectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. MC's 1072 and 1082 couple the processors to respective memories, namely a memory 1032 and a memory 1034, which may be portions of main memory locally attached to the respective processors. While MC logic 1072 and 1082 is illustrated as integrated into the processing elements 1070, 1080, for alternative embodiments the MC logic may be discreet logic outside the processing elements 1070, 1080 rather than integrated therein.

First processing element 1070 and second processing element 1080 may be coupled to an I/O subsystem 1090 via P-P interfaces 1076, 1086 via P-P interconnects 1062, 10104, respectively. As shown, I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, a bus may be used to couple graphics engine 1038 to I/O subsystem 1090. Alternately, a point-to-point interconnect 1039 may couple these components.

In turn, I/O subsystem 1090 may be coupled to a first bus 10110 via an interface 1096. In one embodiment, first bus 10110 may be a Peripheral Component Interconnect (PCI) bus, or a bus such as a PCI Express bus or another third generation I/O interconnect bus, although the scope of the present invention is not so limited.

As shown, various I/O devices 1014 (e.g., a vibration module including a vibratory mechanism such as, for example, an off center weighted disk that rotates about an axis), 1024 may be coupled to first bus 10110, along with a bus bridge 1018 which may couple first bus 10110 to a second bus 1020. In one embodiment, second bus 1020 may be a low pin count (LPC) bus. Various devices may be coupled to second bus 1020 including, for example, a keyboard/mouse 1022, communication device(s) 1026 (which may in turn be in communication with a computer network), and a data storage unit 1028 such as a disk drive or other mass storage device which may include code 1030, in one embodiment. The code 1030 may include instructions for performing embodiments of one or more of the methods described above. Further, an audio I/O 1024 (e.g., a speaker) may be coupled to second bus 1020.

While modules 1041, 1042, 1043, 1044, 1045 are shown in FIG. 4 as being located in chipset 1090 in other embodiments the modules are software modules located in memory (e.g. memory 1032, 1034, 1028, 1030), processor 1070, 1080, and the like.

Note that other embodiments are contemplated. For example, instead of the point-to-point architecture shown, a system may implement a multi-drop bus or another such communication topology. Also, the elements of FIG. 4 may alternatively be partitioned using more or fewer integrated chips than shown in the FIG. 4.

Example 1 includes at least one storage medium having instructions stored thereon for causing a system to: determine a first calendar event attribute corresponding to a first calendar event having a first calendar event start time and a first calendar event end time; determine a first alert attribute, corresponding to a first alert occurring at a first time of day, and whether the first time of day is between the first calendar event start time and the first calendar event end time; in response to determining (a)(i) the first calendar event attribute and the first alert attribute, and (a)(ii) the first time of day is between the first calendar event start time and the first calendar event end time, determining whether the first alert satisfies a first alert threshold; in response to determining (b)(i) the first alert satisfies the first alert threshold, communicating the first alert to a user of the system via a first alert communication channel; and (b)(ii) the first alert does not satisfy the first alert threshold; communicating the first alert to the user via a second alert communication channel and not the first alert communication channel. As used herein, "determine" may include consulting a look-up table for a value, pushing or pulling data to or from a memory, assessing the results of an algorithm or code, or simply receiving a value.

In example 2 the subject matter of Example 1 can optionally include wherein the communicating the first alert to the via the first alert communication channel includes at least one of communicating audio via a speaker coupled to the system and vibrating at least a portion of the system; wherein the communicating the first alert to the user via the second alert communication channel does not include audio delivered via the speaker.

In example 3 the subject matter of any or all of Examples 1-2 can optionally wherein the first calendar event attribute includes a meeting including the user and another person other than the user.

In example 4 the subject matter of any or all of Examples 1-3 can optionally include wherein the first calendar event attribute includes the meeting designated at a first priority level and not at a second priority level, the first priority level being higher than the second priority level in a hierarchy of levels.

In example 5 the subject matter of any or all of Examples 1-4 can optionally include wherein the communicating the first alert to the user via the second alert communication channel includes at least one of: vibrating at least a portion of the system, and displaying a graphic corresponding to the first alert via a display coupled to the system.

In example 6 the subject matter of any or all of Examples 1-5 can optionally include wherein the first time of day is closer to the first calendar event start time than the first calendar event end time, the at least one medium comprising instructions to delay communicating the first alert to the user via at least one of the first and second alert communication channels until at least the first calendar event end time.

In example 7 the subject matter of any or all of Examples 1-6 can optionally include wherein the first calendar event attribute indicates a meeting is an on-line meeting.

In example 8 the subject matter of any or all of Examples 1-7 can optionally include wherein communicating the first alert to the user via the second alert communication channel and not the first alert communication channel is not in response to the user manually selecting a physical button included in the system.

In example 9 the subject matter of any or all of Examples 1-8 can optionally include wherein communicating the first alert to the user via the second alert communication channel and not the first alert communication channel is not in response to the user selecting a generic sleep mode for the system that is not a function of the first calendar even attribute.

In example 10 the subject matter of any or all of Examples 1-9 can optionally include instructions to: determine a second calendar event attribute corresponding to a second calendar event having a second calendar event start time and a second calendar event end time; determine a second alert attribute, corresponding to a second alert occurring at a second time of day, and whether the second time of day is between the second calendar event start time and the second calendar event end time; in response to determining (a)(i) the second calendar event attribute and the second alert attribute, and (a)(ii) the second time of day is between the second calendar event start time and the second calendar event end time, the second time of day being within 4 hours of the first time of day, determining whether the second alert satisfies the first alert threshold; in response to determining (b)(i) the second alert satisfies the first alert threshold, communicating the second alert to the user via the first alert communication channel; and (b)(ii) the second alert does not satisfy the first alert threshold; communicating the second alert to the user via the second alert communication channel and not the first alert communication channel.

In example 11 the subject matter of any or all of Examples 1-10 can optionally include instructions to: determine the first calendar event attribute includes a meeting including the user and another person other than the user and the second calendar event attribute does not include a meeting between the user and any other person; in response to determining the first calendar event attribute includes the meeting and the second calendar event attribute does not include the meeting, determine the first alert satisfies the first alert threshold and the second alert does not satisfy the first alert threshold.

In example 12 the subject matter of any or all of Examples 1-11 can optionally include instructions to: determine a priority level for the another person; in response to determining the priority level for the another person, determine the first alert satisfies the first alert threshold.

Example 13 the subject matter of any or all of Examples 1-12 can optionally include wherein the first alert includes a message and the a first alert attribute couples to a string, the at least one medium comprising instructions to determine whether the first alert satisfies the first alert threshold in response to the string.

In example 14 the subject matter of any or all of Examples 1-13 can optionally include instructions to communicate the first alert to the user via the first alert communication channel when a setting for the system, which includes mute and non-mute settings, is set to non-mute.

In example 15 the subject matter of any or all of Examples 1-14 can optionally include wherein the system includes a hardware-based button that switches the system between the mute and non-mute settings.

In example 16 the subject matter of any or all of Examples 1-15 can optionally include. instructions: to determine an additional first alert attribute; and in response to determining the first alert attribute and the additional first alert attribute, determining whether the first alert satisfies a first alert threshold; wherein the first alert attribute corresponds to a light sensor for the system and the additional first alert attribute corresponds to a spatial orientation of the system.

Example 17 includes at least one storage medium having instructions stored thereon for causing a system to: determine a calendar event attribute for a calendar event; determine an alert attribute for an alert that occurs during the calendar event; in response to determining the calendar event attribute and the alert attribute, determining whether the alert satisfies an alert threshold; and in response to determining (a)(i) the alert satisfies the alert threshold, communicating the alert to a user via a first communication channel; and (a)(ii) the alert does not satisfy the alert threshold, communicating the alert to the user via a second communication channel.

In example 18 the subject matter of Example 17 can optionally include wherein the communicating the alert via the first communication channel includes at least one of communicating audio via a speaker and vibrating the system; wherein the communicating the alert via the second communication channel does not include audio delivered via the speaker.

In example 19 the subject matter of Examples 17-18 can optionally include wherein the calendar event attribute includes a meeting including the user and another person.

In example 20 the subject matter of any or all of Examples 17-19 can optionally include wherein the calendar event attribute includes the meeting designated at a first priority level and not at a second priority level, the first priority level being higher than the second priority level in a hierarchy of levels.

In example 21 the subject matter of any or all of Examples 17-20 can optionally include the at least one medium comprising instructions to delay communicating the alert to the user until at least an end of the meeting.

In example 22 the subject matter of any or all of Examples 17-21 can optionally include instructions to: determine a second calendar event attribute for a second calendar event; determine a second alert attribute for a second alert that occurs during the second calendar event; in response to determining the second calendar event attribute and the second alert attribute, determining whether the second alert satisfies the alert threshold; in response to determining (a)(i) the second alert satisfies the alert threshold, communicating the second alert to the user via the first communication channel; and (a)(ii) the second alert does not satisfy the alert threshold, communicating the second alert to the user via the second communication channel and not the first communication channel.

In example 23 the subject matter of any or all of Examples 17-22 can optionally include instructions to: determine a priority level for the another person; in response to determining the priority level for the another person, determine the alert satisfies the alert threshold.

Example 24 includes an apparatus comprising: at least one memory; at least one processor, coupled to the memory, to perform operations comprising: determine a calendar event attribute for a calendar event; determine an alert attribute for an alert that occurs during the calendar event; in response to determining the calendar event attribute and the alert attribute, determining whether the alert satisfies an alert threshold; and in response to determining (a)(i) the alert satisfies the alert threshold, communicating the alert to a user via a first communication channel; and (a)(ii) the alert does not satisfy the alert threshold, communicating the alert to the user via a second communication channel.

In example 25 the subject matter of Example 24 can optionally include wherein the communicating the alert via the first communication channel includes at least one of communicating audio via a speaker and vibrating the system; wherein the communicating the alert via the second communication channel does not include audio delivered via the speaker.

In example 26 the subject matter of Example 17 can optionally include wherein the calendar event comprises a calendar event start time and a calendar event end time, and wherein the alert attribute is to occur at a time of day and further comprising instructions to determine whether the alert attribute falls within the calendar event start time and the calendar event end time.

Example 27 includes an apparatus comprising: at least one memory; at least one processor coupled to the memory: a calendar event attribute determination module, coupled to the processor, to determine a calendar event attribute for a calendar event; a first alert attribute determination module, coupled to the processor, to determine an alert attribute for an alert that occurs during the calendar event; an alert threshold determination module, coupled to the processor, to, in response to determining the calendar event attribute and the alert attribute, determine whether the alert satisfies an alert threshold; and an alert communication module, coupled to the processor, to, in response to determining (a)(i) the alert satisfies the alert threshold, communicate the alert to a user via a first communication channel; and (a)(ii) the alert does not satisfy the alert threshold, communicate the alert to the user via a second communication channel.

In Example 28 the subject matter of Example 27 can optionally include wherein the first communication channel includes at least one of a speaker and a vibration module; wherein the second communication channel does not include the speaker.

Example 1a includes a method executed by at least one processor comprising: determining a first calendar event attribute corresponding to a first calendar event having a first calendar event start time and a first calendar event end time; determining a first alert attribute, corresponding to a first alert occurring at a first time of day, and whether the first time of day is between the first calendar event start time and the first calendar event end time; in response to determining (a)(i) the first calendar event attribute and the first alert attribute, and (a)(ii) the first time of day is between the first calendar event start time and the first calendar event end time, determining whether the first alert satisfies a first alert threshold; in response to determining (b)(i) the first alert satisfies the first alert threshold, communicating the first alert to a user of the system via a first alert communication channel; and (b)(ii) the first alert does not satisfy the first alert threshold, communicating the first alert to the user via a second alert communication channel and not the first alert communication channel.

In example 2a the subject matter of Example 1a can optionally include 2. The method of claim 1, wherein the communicating the first alert to the via the first alert communication channel includes at least one of communicating audio via a speaker coupled to the system and vibrating at least a portion of the system; wherein the communicating the first alert to the user via the second alert communication channel does not include audio delivered via the speaker.

In example 3a the subject matter of any or all of Examples 1a-2a can optionally include wherein the first calendar event attribute includes a meeting including the user and another person other than the user.

In example 4a the subject matter of any or all of Examples 1a-3a can optionally include wherein the first calendar event attribute includes the meeting designated at a first priority level and not at a second priority level, the first priority level being higher than the second priority level in a hierarchy of levels.

In example 5a the subject matter of any or all of Examples 1a-4a can optionally include wherein the communicating the first alert to the user via the second alert communication channel includes at least one of: vibrating at least a portion of the system, and displaying a graphic corresponding to the first alert via a display coupled to the system.

In example 6a the subject matter of any or all of Examples 1a-5a can optionally include wherein the first time of day is closer to the first calendar event start time than the first calendar event end time, the at least one medium comprising instructions to delay communicating the first alert to the user via at least one of the first and second alert communication channels until at least the first calendar event end time.

In example 7a the subject matter of any or all of Examples 1a-6a can optionally include wherein the first calendar event attribute indicates a meeting is an on-line meeting.

In example 8a the subject matter of any or all of Examples 1a-7a can optionally include wherein communicating the first alert to the user via the second alert communication channel and not the first alert communication channel is not in response to the user manually selecting a physical button included in the system.

In example 9a the subject matter of any or all of Examples 1a-8a can optionally include wherein communicating the first alert to the user via the second alert communication channel and not the first alert communication channel is not in response to the user selecting a generic sleep mode for the system that is not a function of the first calendar even attribute.

In example 10a the subject matter of any or all of Examples 1a-9a can optionally include determining a second calendar event attribute corresponding to a second calendar event having a second calendar event start time and a second calendar event end time; determine a second alert attribute, corresponding to a second alert occurring at a second time of day, and whether the second time of day is between the second calendar event start time and the second calendar event end time; in response to determining (a)(i) the second calendar event attribute and the second alert attribute, and (a)(ii) the second time of day is between the second calendar event start time and the second calendar event end time, the second time of day being within 4 hours of the first time of day, determining whether the second alert satisfies the first alert threshold; in response to determining (b)(i) the second alert satisfies the first alert threshold, communicating the second alert to the user via the first alert communication channel; and (b)(ii) the second alert does not satisfy the first alert threshold; communicating the second alert to the user via the second alert communication channel and not the first alert communication channel.

In example 11a the subject matter of any or all of Examples 1a-10a can optionally include determining the first calendar event attribute includes a meeting including the user and another person other than the user and the second calendar event attribute does not include a meeting between the user and any other person; in response to determining the first calendar event attribute includes the meeting and the second calendar event attribute does not include the meeting, determining the first alert satisfies the first alert threshold and the second alert does not satisfy the first alert threshold.

In example 12a the subject matter of any or all of Examples 1a-11a can optionally include determining a priority level for the another person; in response to determining the priority level for the another person, determine the first alert satisfies the first alert threshold.

In example 13a the subject matter of any or all of Examples 1a-12a wherein the first alert includes a message and the first alert attribute couples to a string, the at least one medium comprising instructions to determine whether the first alert satisfies the first alert threshold in response to the string.

In example 14a the subject matter of any or all of Examples 1a-13a including communicating the first alert to the user via the first alert communication channel when a setting for the system, which includes mute and non-mute settings, is set to non-mute.

In example 15a the subject matter of any or all of Examples 1a-14a wherein the system includes a hardware-based button that switches the system between the mute and non-mute settings.

In example 16a the subject matter of any or all of Examples 1a-15a comprising determining an additional first alert attribute; and in response to determining the first alert attribute and the additional first alert attribute, determining whether the first alert satisfies a first alert threshold; wherein the first alert attribute corresponds to a light sensor for the system and the additional first alert attribute corresponds to a spatial orientation of the system.

Example 17a includes a method executed by at least one processor comprising: determining a calendar event attribute for a calendar event; determining an alert attribute for an alert that occurs during the calendar event; in response to determining the calendar event attribute and the alert attribute, determining whether the alert satisfies an alert threshold; and in response to determining (a)(i) the alert satisfies the alert threshold, communicating the alert to a user via a first communication channel; and (a)(ii) the alert does not satisfy the alert threshold, communicating the alert to the user via a second communication channel.

Example 18a includes the method of claim 17a, wherein the communicating the alert via the first communication channel includes at least one of communicating audio via a speaker and vibrating the system; wherein the communicating the alert via the second communication channel does not include audio delivered via the speaker.

Example 19a includes the subject matter of any or all of Examples 17a-18a wherein the calendar event attribute includes a meeting including the user and another person.

Example 20a includes the subject matter of any or all of Examples 17a-19a wherein the calendar event attribute includes the meeting designated at a first priority level and not at a second priority level, the first priority level being higher than the second priority level in a hierarchy of levels.

Example 21a includes the subject matter of any or all of Examples 17a-20a comprising delaying communicating the alert to the user until at least an end of the meeting.

Example 22a includes the subject matter of any or all of Examples 17a-21a comprising: determining a second calendar event attribute for a second calendar event; determine a second alert attribute for a second alert that occurs during the second calendar event; in response to determining the second calendar event attribute and the second alert attribute, determining whether the second alert satisfies the alert threshold; in response to determining (a)(i) the second alert satisfies the alert threshold, communicating the second alert to the user via the first communication channel; and (a)(ii) the second alert does not satisfy the alert threshold, communicating the second alert to the user via the second communication channel and not the first communication channel.

Example 23a includes the subject matter of any or all of Examples 17a-22a comprising: determining a priority level for the another person; in response to determining the priority level for the another person, determine the alert satisfies the alert threshold.

Example 24a includes a communications device arranged to carry out a method according to any one of example 1a-16a.

Example 25a includes a communications device arranged to carry out a method according to any one of examples 17a-23a.

Example 26a includes an apparatus comprising means for performing any one of examples 1a to 16a.

Example 27a includes an apparatus comprising means for performing any one of examples 17a to 23a.

Examples 1b-13b are now discussed.

1b. An apparatus comprising: at least one memory; at least one processor, coupled to the memory; a calendar event attribute determination module to determine a first calendar event attribute corresponding to a first calendar event having a first calendar event start time and a first calendar event end time; a first alert attribute determination module to determine a first alert attribute, corresponding to a first alert occurring at a first time of day, and whether the first time of day is between the first calendar event start time and the first calendar event end time; an alert threshold determination module to, in response to determining (a)(i) the first calendar event attribute and the first alert attribute, and (a)(ii) the first time of day is between the first calendar event start time and the first calendar event end time, determine whether the first alert satisfies a first alert threshold; an alert communication module to, in response to determining (b)(i) the first alert satisfies the first alert threshold, communicating the first alert to a user of the system via a first alert communication channel; and (b)(ii) the first alert does not satisfy the first alert threshold, communicate the first alert to the user via a second alert communication channel and not the first alert communication channel.

2b. The apparatus of example 1b, wherein the communicating the first alert to the user via the first alert communication channel includes at least one of communicating audio via a speaker coupled to the system and vibrating at least a portion of the system; wherein the communicating the first alert to the user via the second alert communication channel does not include audio delivered via the speaker 3b. The apparatus of example 2b, wherein the first calendar event attribute includes a meeting including the user and another person other than the user.

4b. The apparatus of example 3b, wherein the first calendar event attribute includes the meeting designated at a first priority level and not at a second priority level, the first priority level being higher than the second priority level in a hierarchy of levels.

5b. The apparatus of example 3b, wherein the communicating the first alert to the user via the second alert communication channel includes at least one of: vibrating at least a portion of the system, and displaying a graphic corresponding to the first alert via a display coupled to the system.

6b. The apparatus of example 3b, wherein the first time of day is closer to the first calendar event start time than the first calendar event end time, the apparatus comprising a delay module to delay communicating the first alert to the user via at least one of the first and second alert communication channels until at least the first calendar event end time.

7b. The apparatus of example 2b, wherein the first calendar event attribute indicates a meeting is an on-line meeting.

8b. The apparatus of example 1b, wherein communicating the first alert to the user via the second alert communication channel and not the first alert communication channel is not in response to the user manually selecting a physical button included in the system.

9b. The apparatus of example 1b, wherein communicating the first alert to the user via the second alert communication channel and not the first alert communication channel is not in response to the user selecting a generic sleep mode for the system that is not a function of the first calendar even attribute.

10b. The apparatus of example 1b, comprising: another calendar event attribute determination module to determine a second calendar event attribute corresponding to a second calendar event having a second calendar event start time and a second calendar event end time; another first alert attribute determination module to determine a second alert attribute, corresponding to a second alert occurring at a second time of day, and whether the second time of day is between the second calendar event start time and the second calendar event end time; another alert threshold determination module to, in response to determining (a)(i) the second calendar event attribute and the second alert attribute, and (a)(ii) the second time of day is between the second calendar event start time and the second calendar event end time, the second time of day being within 4 hours of the first time of day, determine whether the second alert satisfies the first alert threshold; another alert communication module to, in response to determining (b)(i) the second alert satisfies the first alert threshold, communicating the second alert to the user via the first alert communication channel; and (b)(ii) the second alert does not satisfy the first alert threshold; communicate the second alert to the user via the second alert communication channel and not the first alert communication channel.

11b. The apparatus of example 1b, comprising: an additional module to determine the first calendar event attribute includes a meeting including the user and another person other than the user and the second calendar event attribute does not include a meeting between the user and any other person; another module to, in response to determining the first calendar event attribute includes the meeting and the second calendar event attribute does not include the meeting, determine the first alert satisfies the first alert threshold and the second alert does not satisfy the first alert threshold.

12b. The apparatus of example 1b, wherein the first alert includes a message and the first alert attribute couples to a string, the at least one medium comprising instructions to determine whether the first alert satisfies the first alert threshold in response to the string.

13b. The apparatus of example 14b, wherein the system includes a hardware-based button that switches the system between the mute and non-mute settings.

Examples 1c-23c, are now discussed.

1c. A processing system comprising: means for determining a first calendar event attribute corresponding to a first calendar event having a first calendar event start time and a first calendar event end time; means for determining a first alert attribute, corresponding to a first alert occurring at a first time of day, and whether the first time of day is between the first calendar event start time and the first calendar event end time; in response to determining (a)(i) the first calendar event attribute and the first alert attribute, and (a)(ii) the first time of day is between the first calendar event start time and the first calendar event end time, means for determining whether the first alert satisfies a first alert threshold; in response to determining (b)(i) the first alert satisfies the first alert threshold, communicating the first alert to a user of the system via a first alert communication channel; and (b)(ii) the first alert does not satisfy the first alert threshold, means for communicating the first alert to the user via a second alert communication channel and not the first alert communication channel.

2c. The system of claim 1c, wherein the communicating the first alert to the via the first alert communication channel includes at least one of communicating audio via a speaker coupled to the system and vibrating at least a portion of the system; wherein the communicating the first alert to the user via the second alert communication channel does not include audio delivered via the speaker.

3c. The system of claim 2c, wherein the first calendar event attribute includes a meeting including the user and another person other than the user 4c. The system of claim 3c, wherein the first calendar event attribute includes the meeting designated at a first priority level and not at a second priority level, the first priority level being higher than the second priority level in a hierarchy of level 5c. The system of claim 3c, wherein the communicating the first alert to the user via the second alert communication channel includes at least one of: vibrating at least a portion of the system, and displaying a graphic corresponding to the first alert via a display coupled to the system.

6c. The system of claim 3c, wherein the first time of day is closer to the first calendar event start time than the first calendar event end time, the system comprising means for delaying communicating the first alert to the user via at least one of the first and second alert communication channels until at least the first calendar event end time.

7c. The system of claim 2c, wherein the first calendar event attribute indicates a meeting is an on-line meeting.

8c. The system of claim 1c, wherein communicating the first alert to the user via the second alert communication channel and not the first alert communication channel is not in response to the user manually selecting a physical button included in the system.

9c. The system of claim 1c, wherein communicating the first alert to the user via the second alert communication channel and not the first alert communication channel is not in response to the user selecting a generic sleep mode for the system that is not a function of the first calendar even attribute.

10c. The system of claim 1c, comprising: means for determining a second calendar event attribute corresponding to a second calendar event having a second calendar event start time and a second calendar event end time; means for determining a second alert attribute, corresponding to a second alert occurring at a second time of day, and whether the second time of day is between the second calendar event start time and the second calendar event end time; in response to determining (a)(i) the second calendar event attribute and the second alert attribute, and (a)(ii) the second time of day is between the second calendar event start time and the second calendar event end time, the second time of day being within 4 hours of the first time of day, means for determining whether the second alert satisfies the first alert threshold; in response to determining (b)(i) the second alert satisfies the first alert threshold, communicating the second alert to the user via the first alert communication channel; and (b)(ii) the second alert does not satisfy the first alert threshold; means for communicating the second alert to the user via the second alert communication channel and not the first alert communication channel.

11c. The system of claim 1c, comprising: means for determining the first calendar event attribute includes a meeting including the user and another person other than the user and the second calendar event attribute does not include a meeting between the user and any other person; in response to determining the first calendar event attribute includes the meeting and the second calendar event attribute does not include the meeting, means for determining the first alert satisfies the first alert threshold and the second alert does not satisfy the first alert threshold.

12c. The system of claim 3c, comprising: means for determining a priority level for the another person; in response to determining the priority level for the another person, means for determining the first alert satisfies the first alert threshold.

13c. The system of claim 3c, wherein the first alert includes a message and the first alert attribute couples to a string, the system comprising means for determining whether the first alert satisfies the first alert threshold in response to the string.

14c. The system of claim 3c, comprising means for communicating the first alert to the user via the first alert communication channel when a setting for the system, which includes mute and non-mute settings, is set to non-mute.

15c. The system of claim 14c, wherein the system includes a hardware-based button that switches the system between the mute and non-mute settings.

16c. The system of claim 1c, comprising: means for determining an additional first alert attribute; and in response to determining the first alert attribute and the additional first alert attribute, means for determining whether the first alert satisfies a first alert threshold; wherein the first alert attribute corresponds to a light sensor for the system and the additional first alert attribute corresponds to a spatial orientation of the system.

17c. A system executed by at least one processor comprising: means for determining a calendar event attribute for a calendar event; means for determining an alert attribute for an alert that occurs during the calendar event; in response to determining the calendar event attribute and the alert attribute, means for determining whether the alert satisfies an alert threshold; and in response to determining (a)(i) the alert satisfies the alert threshold, communicating the alert to a user via a first communication channel; and (a)(ii) the alert does not satisfy the alert threshold, means for communicating the alert to the user via a second communication channel.

18c. The system of claim 17c, wherein the communicating the alert via the first communication channel includes at least one of communicating audio via a speaker and vibrating the system; wherein the communicating the alert via the second communication channel does not include audio delivered via the speaker.

19c. The system of claim 18c, wherein the calendar event attribute includes a meeting including the user and another person.

20c. The system of claim 19c, wherein the calendar event attribute includes the meeting designated at a first priority level and not at a second priority level, the first priority level being higher than the second priority level in a hierarchy of levels.

21c. The system of claim 19c comprising means for delaying communicating the alert to the user until at least an end of the meeting.

22c. The system of claim 19c comprising: means for determining a second calendar event attribute for a second calendar event; means for determining a second alert attribute for a second alert that occurs during the second calendar event; in response to determining the second calendar event attribute and the second alert attribute, means for determining whether the second alert satisfies the alert threshold; in response to determining (a)(i) the second alert satisfies the alert threshold, communicating the second alert to the user via the first communication channel; and (a)(ii) the second alert does not satisfy the alert threshold, means for communicating the second alert to the user via the second communication channel and not the first communication channel.

23c. The system of claim 19c comprising: means for determining a priority level for the another person; in response to determining the priority level for the another person, means for determining the alert satisfies the alert threshold.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory storage medium having instructions stored thereon for causing a system, including at least one processor, to:
   determine, via an operating system (OS) and in response to user input received via a graphical user interface (GUI), a calendar event attribute for a calendar event;
   receive an alert communicated from cloud-based storage via at least one antenna;
   determine an alert attribute for the alert that occurs during the calendar event;
   receive a communication from at least one sensor included in the system, the at least one sensor including at least one of a light sensor, a spatial orientation system, and a motion sensor;
   determine an additional alert attribute in response to receiving the communication from the at least one sensor;
   in response to determining the calendar event attribute and the alert attribute and the additional alert attribute, determine whether the alert satisfies an alert threshold; and
   in response to determining (a)(i) the alert satisfies the alert threshold, communicate the alert to a user via a first communication channel, an input/output (I/O) node, and a communication bus; and (a)(ii) the alert does not satisfy the alert threshold, communicate the alert to the user via a second communication channel, at least one of the I/O node and an additional I/O node, and at least one of the communication bus and an additional communication bus;
   wherein (a) the first and second communication channels are both electronic communication channels, including at least one of a visual display, an audio speaker, and a vibratory module, that are coupled to the at least one processor, and (b) the calendar event attribute and the alert attribute are both stored in the at least one non-transitory storage medium;
   wherein the calendar event attribute comprises a meeting, including the user and another person other than the user, designated at a first priority level and not at a second priority level, the first priority level being higher than the second priority level in a hierarchy of levels.

2. The at least one medium of claim 1, wherein the calendar event comprises a calendar event start time and a calendar event end time, and wherein the alert is to occur at a time of day and comprising instructions to determine whether the time of day is between the calendar event start time and the calendar event end time.

3. The at least one medium of claim 2 comprising instructions to,
   in response to determining the time of day is between the calendar event start time and the calendar event end time, determining whether the alert satisfies the alert threshold.

4. The at least one medium of claim 3,
   wherein the communicating the alert to the user via the first communication channel includes at least one of communicating audio via a speaker coupled to the system and vibrating at least a portion of the system;
   wherein the communicating the alert to the user via the second communication channel does not include audio delivered via the speaker.

5. The at least one medium of claim 1, wherein the communicating the alert to the user via the second communication channel includes at least one of: vibrating at least a portion of the system, and displaying a graphic corresponding to the alert via a display coupled to the system.

6. The at least one medium of claim 1 comprising instructions to
   delay communicating the alert to the user via at least one of the first and second communication channels until at least a calendar event end time for the calendar event;
   wherein delaying communicating the alert includes storing a notification in a delay log included within at least one of the at least one non-transitory storage medium and cloud-based storage.

7. The at least one medium of claim 1, wherein the calendar event attribute indicates the meeting is an on-line meeting.

8. The at least one medium of claim 2, wherein communicating the alert to the user via the second communication channel and not the first communication channel is not in response to the user manually selecting a physical button included in the system.

9. The at least one medium of claim 2, wherein communicating the alert to the user via the second communication channel and not the first communication channel is not in response to the user selecting a generic sleep mode for the system that is not a function of the calendar event attribute.

10. The at least one medium of claim 2 comprising instructions to:
    determine a second calendar event attribute corresponding to a second calendar event having a second calendar event start time and a second calendar event end time;
    determine a second alert attribute, corresponding to a second alert occurring at a second time of day, and whether the second time of day is between the second calendar event start time and the second calendar event end time;

in response to determining (a)(i) the second calendar event attribute and the second alert attribute, and (a)(ii) the second time of day is between the second calendar event start time and the second calendar event end time, the second time of day being within 4 hours of the time of day, determining whether the second alert satisfies the alert threshold;

in response to determining (b)(i) the second alert satisfies the alert threshold, communicating the second alert to the user via the first communication channel; and (b)(ii) the second alert does not satisfy the alert threshold, communicating the second alert to the user via the second communication channel and not the first communication channel.

11. The at least one medium of claim 10, comprising instructions to:

determine the second calendar event attribute does not include an additional meeting between the user and any other person;

in response to determining the calendar event attribute includes the meeting and the second calendar event attribute does not include the additional meeting, determine the alert satisfies the alert threshold and the second alert does not satisfy the alert threshold.

12. The at least one medium of claim 1 comprising instructions to:

determine a priority level for the another person; and in response to determining the priority level for the another person, determine the alert satisfies the alert threshold.

13. The at least one medium of claim 1, wherein the alert includes a message and the alert attribute couples to a string, the at least one medium comprising instructions to determine whether the alert satisfies the alert threshold in response to the string.

14. The at least one medium of claim 1 comprising instructions to communicate the alert to the user via the first communication channel when a setting for the system, which includes mute and non-mute settings, is set to non-mute.

15. The at least one medium of claim 14, wherein the system includes a hardware-based switch that switches the system between the mute and non-mute settings.

16. An apparatus comprising:
at least one memory;
at least one processor coupled to the memory:
at least one sensor;
a calendar event attribute determination module, coupled to the at least one processor, to determine a calendar event attribute for a calendar event;
an alert attribute determination module, coupled to the at least one processor, to (a) receive a communication derived from the at least one sensor, the at least one sensor including at least one of a light sensor, a spatial orientation system, and a motion sensor; (b) determine an alert attribute for an alert that occurs during the calendar event; and (c) determine an additional alert attribute in response to receiving the communication derived from the at least one sensor;
an alert threshold determination module, coupled to the processor, to, in response to determining the calendar event attribute and the alert attribute and the additional alert attribute, determine whether the alert satisfies an alert threshold; and
an alert communication module, coupled to the processor, to, in response to determining (a)(i) the alert satisfies the alert threshold, communicate the alert to a user via a first communication channel; and (a)(ii) the alert does not satisfy the alert threshold, communicate the alert to the user via a second communication channel;

wherein (a) the first and second communication channels are both electronic communication channels that are coupled to the at least one processor, and (b) the calendar event attribute determination module and the alert attribute determination module respectively store the calendar event attribute and the alert attribute in the at least one memory;

wherein the alert communication module is to delay communicating the alert to the user via at least one of the first and second communication channels until at least a calendar event end time for the calendar event.

17. The apparatus of claim 16,
wherein the first communication channel includes at least one of a speaker and a vibration module;
wherein the second communication channel does not include the speaker.

18. A method executed by at least one processor comprising:

receiving a communication derived from the at least one sensor, the at least one sensor including at least one of a light sensor, a spatial orientation system, and a motion sensor; and determining a calendar event attribute for a calendar event;

determining (a) an alert attribute for an alert that occurs during the calendar event; and (b) an additional alert attribute in response to receiving the communication derived from the at least one sensor;

storing the calendar event attribute and the alert attribute in at least one non-transitory storage medium coupled to the at least one processor;

in response to determining the calendar event attribute and the alert attribute and the additional alert attribute, determining whether the alert satisfies an alert threshold; and in response to determining (a)(i) the alert satisfies the alert threshold, communicating the alert to a user via a first communication channel; and (a)(ii) the alert does not satisfy the alert threshold, communicating the alert to the user via a second communication channel;

wherein the first and second communication channels are both electronic communication channels that are coupled to the at least one processor;

wherein the calendar event attribute includes a meeting, including the user and another person, designated at a first priority level and not at a second priority level, the first priority level being higher than the second priority level in a hierarchy of levels.

19. The method of claim 18,
wherein the communicating the alert via the first communication channel includes at least one of communicating audio via a speaker and vibrating the system;
wherein the communicating the alert via the second communication channel does not include audio delivered via the speaker.

20. The method of claim 18 comprising delaying communicating the alert to the user until at least an end of the meeting.

21. The method of claim 18 comprising:
determining a second calendar event attribute for a second calendar event;
determining a second alert attribute for a second alert that occurs during the second calendar event;

in response to determining the second calendar event attribute and the second alert attribute, determining whether the second alert satisfies the alert threshold;

in response to determining (a)(i) the second alert satisfies the alert threshold, communicating the second alert to the user via the first communication channel; and (a)(ii) the second alert does not satisfy the alert threshold, communicating the second alert to the user via the second communication channel and not the first communication channel.

22. The method of claim 18 comprising:

determining a priority level for the another person;

in response to determining the priority level for the another person, determining the alert satisfies the alert threshold.

* * * * *